United States Patent [19]

Jansen et al.

[11] Patent Number: 5,439,660
[45] Date of Patent: Aug. 8, 1995

[54] OXONITRIDES OF THE FORMULA LNTAON₂ WITH ENHANCED BRIGHTNESS AND A PROCESS FOR THEIR PRODUCTION AND USE

[75] Inventors: Martin Jansen; Hans-Peter Letschert, both of Bonn; Dietrich Speer, Hanau, all of Germany

[73] Assignee: Cerdec Aktiengesellschaft Keramische Farben, Frankfurt, Germany

[21] Appl. No.: 213,537

[22] Filed: Mar. 16, 1994

[30] Foreign Application Priority Data

May 26, 1993 [DE] Germany .................. 43 17 421.3

[51] Int. Cl.⁶ .................................. C01F 17/00
[52] U.S. Cl. .................... 423/263; 423/385; 423/409; 501/96; 106/400; 106/401
[58] Field of Search ......... 423/265, 385, 400, 409; 501/96; 106/461, 400, 401

[56] References Cited

U.S. PATENT DOCUMENTS 4,734,390  3/1988  Marchand .................. 501/96

FOREIGN PATENT DOCUMENTS 2573060  5/1986  France .
42 34 938.9  2/1993  Germany .

OTHER PUBLICATIONS

Chemical Abstracts, vol. 117, No. 4, Jul. 27, 1992, abstract number 38907y.

Primary Examiner—Karl Group
Attorney, Agent, or Firm—Beveridge, DeGrandi, Weilacher & Young

[57] ABSTRACT

Oxonitrides with a perovskite of the general formula $LnTaON_2$, where Ln is a rare-earth element, and which exhibit an enhanced brightness, are produced by annealing a powder mixture consisting of a Ta (V) compound and a Ln compound in a reducing atmosphere that contains ammonia. Added to the powder mixture being annealed is a mineralizing agent from the series of alkali metal or alkaline earth halides, $Na_3AlF_6$, $Na_2SiF_6$, $AlF_3$ or of the ammonia salts of carbonic acid or a mono- or dicarboxylic acid with 1 to 4 C atoms in a quantity of 0.1 to 10 parts by weight, relative to 1 part by weight of the mixture of the Ta and Ln compounds. Such oxonitrides can be used as pigments that are yellow-orange to reddish brown in color.

26 Claims, 3 Drawing Sheets

OXONITRIDES OF THE FORMULA LNTAON$_2$ WITH ENHANCED BRIGHTNESS AND A PROCESS FOR THEIR PRODUCTION AND USE

INTRODUCTION AND BACKGROUND

The present invention relates to a process for the production of oxonitrides with a perovskite structure of the formula LnTaON$_2$ (where Ln is a rare-earth element) by means of annealing over a number of hours a powdery mixture containing a tantalum (V) compound and a rare-earth metal compound in a reducing atmosphere that contains ammonia. As compared with the previously known processes of this type, the process according to the present invention unexpectedly provides oxonitrides of enhanced brightness. In another aspect, the invention also relates to the brighter oxonitrides of the formula LnTaON$_2$ that can be obtained with the process of the present invention. Finally, the invention also relates to the use of the oxonitrides obtained by the present process as yellow-orange to reddish brown pigments of enhanced brightness.

Depending on their application and the use of the particles they color, coloring substances and pigments are subject to the most varying impediments. For example, acid or alkaline solutions may release toxicologically questionable components consisting of spinels containing nickel, cobalt, zinc, or chromium, or of cadmium sulfide yellow or cadmium sulfoselenide red or orange. A further problem is the release of toxicologically questionable heavy metals from these kinds of pigments during the incineration of the plastics colored by them in garbage incineration plants. There exists, therefore, a special interest in enlarging the palette of inorganic yellow-orange and reddish brown pigments whose components are more acceptable from the toxicological viewpoint.

German patent application P 42 34 938.9 (U.S. patent application Ser. No. 08/135,998, filed on Oct. 14, 1993, now U.S. Pat. No. 5,376,359, which is incorporated by reference in its entirety) teaches a process for the production of tantalum (V) nitride by nitration of an oxidic tantalum (V) compound with dry ammonia at 750° to 950° C. and the use of the resulting tantalum (V) nitride as a pigment for coloring plastics and lacquers. Tantalum is viewed as toxicologically harmless.

Known from FR-A 2 573 060 (U.S. Pat. No. 4,734,390 which is incorporated by reference in its entirety) are nitrides and oxonitrides of the general formula ABO$_{3-n}$N$_n$ which exhibit a perovskite structure. The general formula includes oxonitrides in which A is a rare-earth element, B is tantalum, and n is the number 2. Compounds of this type are produced by annealing a powder mixture of an oxide, oxonitride, or nitride of element A and an oxide, oxonitride, or nitride of element B in a nitrogen or ammonia atmosphere. Proceeding from the oxides of element A and element B, the specified annealing period is 48 hours, the annealing temperature is about 1000° C., and the reducing gas for nitration is ammonia. The document specifies an end use involving only dielectrical materials and makes no reference to the color of the individual oxonitrides or their use as pigments.

In repeating the known process referred to above, it was established that the resulting oxonitrides of the general formula LaTaON$_2$ basically exhibit brown shades of color which, however, have little brightness and are chromatically unattractive. Also working to a disadvantageous effect in the known process are the long reaction time, the high temperature, and the high flow speed of the ammonia acting as the nitration agent.

SUMMARY OF THE INVENTION

One object of the present invention, therefore, is to provide oxonitrides with a perovskite structure of the formula LnTaON$_2$ (where the symbol Ln as used herein represents a rare-earth element) which exhibit an enhanced tonal brightness as compared to the known products. Another object is to improve the known processes so as to provide the desired brighter oxonitrides. Further aspects of the intended process improvements deal with shortening the necessary reaction time. Yet another object of the present invention is to provide a new use for the oxonitrides.

In achieving the above and other objects, one feature of the present invention resides in a process for producing oxonitrides with a perovskite structure of the formula LnTaON$_2$ (where Ln is a rare-earth element) displaying enhanced brightness by forming a powdery mixture containing (a) a tantalum (V) compound from the series Ta(V) oxide, Ta(V) oxide hydrates, or Ta(V) oxonitrides, (b) a rare-earth metal compound from the series of oxides, oxide hydrates, hydroxides, carbonates, nitrates or carboxylates of a C$_1$ to C$_4$ mono- or dicarboxylic acid, and (c) at least one mineralizing agent from the series of alkali or earth alkali halides, Na$_3$AlF$_6$, Na$_2$SiF$_6$, AlF$_3$ or of the ammonia salts of carbonic acid or a mono- or dicarboxylic acid with 1 to 4 C atoms. The powdery mixture is then subjected to a multi-hour annealing step by heating to the annealing temperature in a reducing atmosphere that contains ammonia. The mineralizing agent is present in a quantity of 0.1 to 10 parts by weight per parts by weight of the mixture of the Ta and Ln compounds, and to the extent necessary the mineralizing agent(s) are removed from the annealed reaction product by means of a wet treatment.

BRIEF DESCRIPTION OF THE DRAWINGS

The present invention will be further understood with reference to the drawings, wherein.

DETAILED DESCRIPTION OF THE INVENTION

Rare earth metals are defined herein as Sc, Y and the lanthanides (La-Lu, elements 57-71 of the Periodic Table of Elements) and are represented by the symbol "Ln" used herein.

Alkali metals are defined herein as Li, Na, K, Rb and Cs.

Alkaline earth metals are defined herein as Mg, Ca, Sr, Ba, and Ra.

The oxonitrides of the formula LnTaON$_2$ provided by the process according to the present invention surprisingly have a yellow-orange to reddish brown color.

The absorption edge of the UV spectra of the oxonitrides according to the present invention is unexpectedly displaced in the direction of longer wavelengths as compared to those of already known oxonitrides. As compared to the oxonitrides of enhanced brightness provided by the present invention, the oxonitrides of the same chemical composition produced with the known process are always considerably duller and browner in visual effect. Without being bound by theory, it is assumed that the greater brightness of the oxonitrides according to the present invention is the result of the more complete conversion—and thus the higher phase purity—permitted by the invention, as well as of a greater particle fineness and more narrow particle size range, as determined by the present process.

Figure 1:
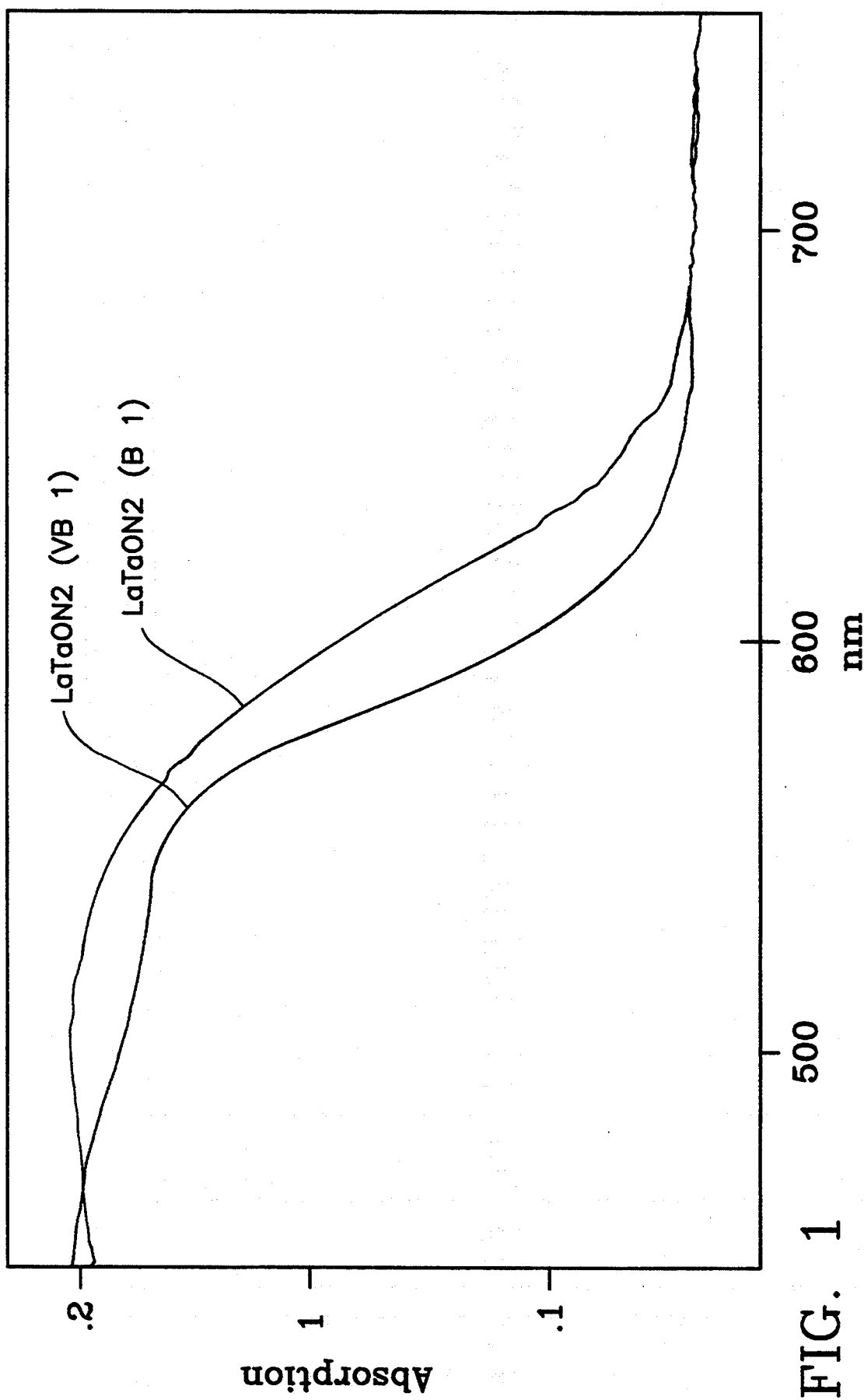
FIG. 1 is a graph comparing the absorption spectra for the LaTaON$_2$ produced according to the known process (VB 1) and the process according to the present invention (B 1)
Figure 2:
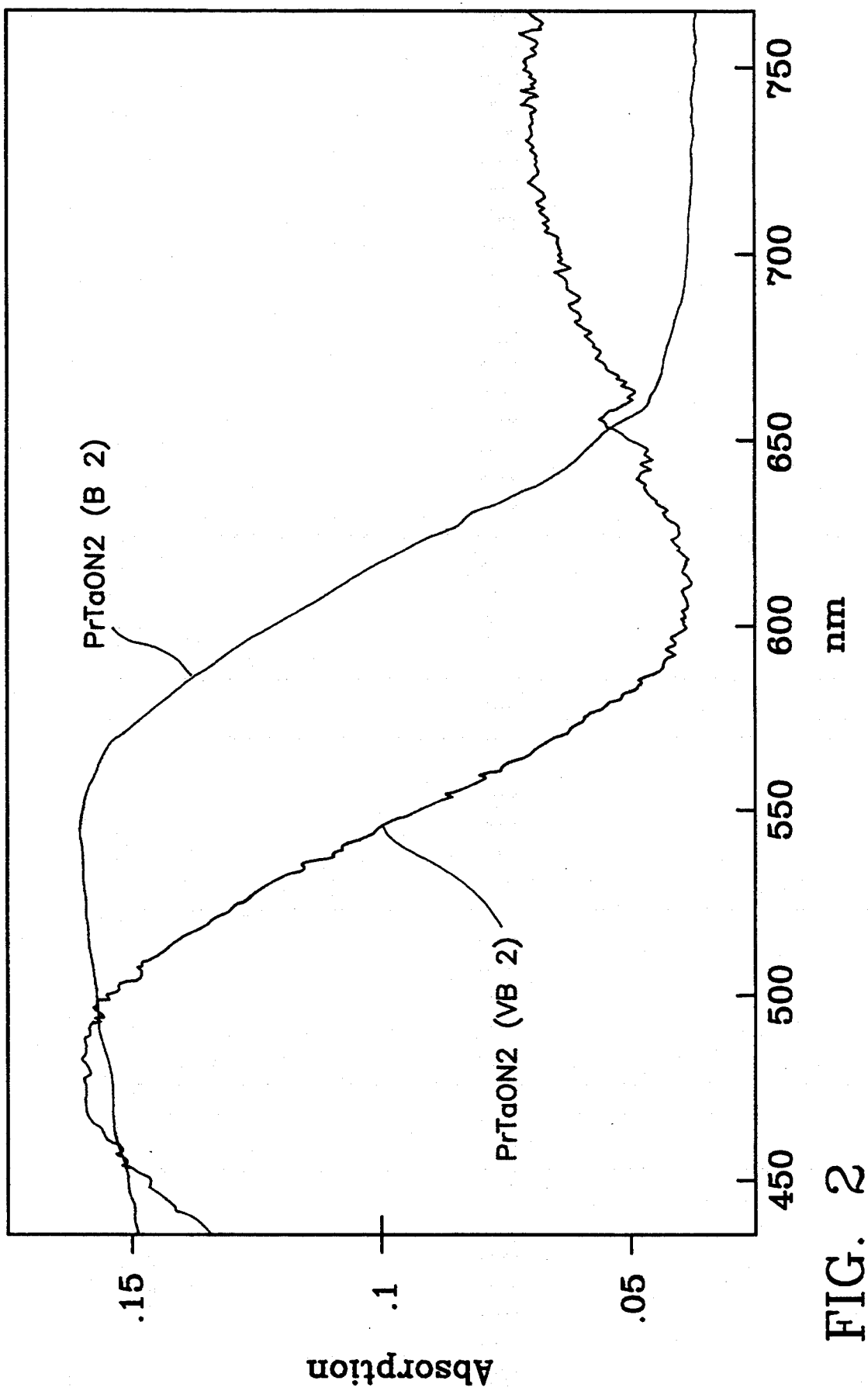
FIG. 2 is a graph comparing the absorption spectra for the PrTaON$_2$ produced according to the known process (VB 2) and the process according to the present invention (B 2)
Figure 3:
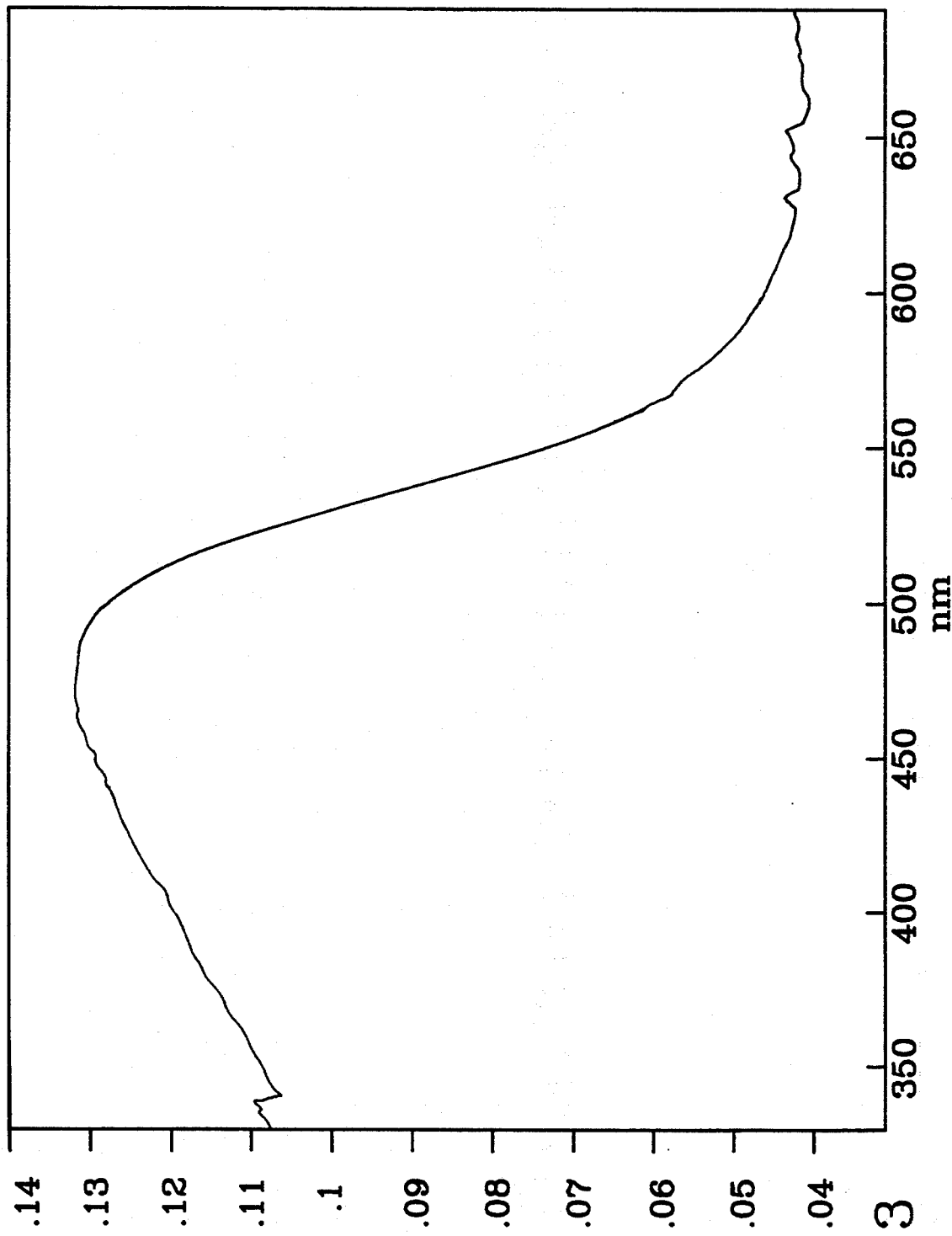
FIG. 3 is a graph comparing the absorption spectra for GdTaON$_2$ produced according to the present invention.

The preferred oxonitrides provided by the present invention are compounds of yttrium, lanthanum, cerium, praseodymium, neodymium, samarium, europium, and gadolinium. Especially preferred are $LaTaON_2$, $PrTaON_2$, and $GdTaON_2$: the first two compounds have attractive reddish brown shades, while $GdTaON_2$ is luminously orange. In FIGS. 1 to 3 the absorption spectra of the indicated compounds are compared to the oxonitrides produced by the known process: FIG. 1 shows the absorption spectra for the $LaTaON_2$ produced according to the known process (VB 1) and the process according to the present invention (B 1); FIG. 2 shows the absorption spectra for the $PrTaON_2$ produced according to the known process (VB 2) and the process according to the present invention (B 2); FIG. 3 shows the absorption spectra for $GdTaON_2$ produced according to the present invention.

In the production of the oxonitrides according to the present invention, the mixture being annealed contains a tantalum (V) compound in the form of the oxide $Ta_2O_5$; a tantalum (V) oxide hydrate of the formula $Ta_2O_5.aq$, where aq indicates hydration water, and the aq quantity is 14 to 17% by weight, relative to $Ta_2O_5.aq$; or a tantalum (V) oxonitride, particularly TaON. Preferred are $Ta_2O_5$ and $Ta_2O_5.aq$ (the above indicated hydrate content of 14 to 17% by weight corresponds to a tetra to pentahydrate). An advantageous X-ray amorphous $Ta_2O_5.aq$ with a residual water content of about 16% by weight, determined by annealing up to 1000° C., can be produced by dissolving tantalum (V) chloride in a concentrated salt solution and precipitating $Ta_2O_5.aq$ after diluting with water and adding an ammonia solution at pH 7, and by washing and drying the precipitated product.

Apart from the oxide, the rare-earth metal compound employed can be in the preliminary oxide stages, i.e., compounds which are converted into an oxide of the formula $Ln_2O_3$ during heating to the annealing temperature. Particularly preferred are the oxide, an oxide hydrate, or the hydroxide of a rare-earth element with the atomic number 39, 57 to 60, and 62 to 71. Among the rare-earth elements, those with an atomic number of 57 to 60 and 62 to 64 are preferred, particularly lanthanum, praseodymium, and gadolinium. Although it is advantageous to employ the rare-earth metal compounds in as pure a form as possible, compounds which contain more than one rare-earth element can also be used.

The mixture being annealed contains the tantalum (V) compound and the Ln compound in a stoichiometric relationship such that an atomic ratio of tantalum to lanthanum, or to the lanthanide element, of about 1 to 1 is produced. For example, if $Ta_2O_5$ and $La_2O_3$ are used as raw materials, they are employed in an equimolar ratio.

A mineralizing agent is a component of the mixture being annealed that is essential to the present invention; this may be an single substance or a mixture of substances. Among the alkali metal and alkaline earth halides that are effective as mineralizing agents, preferred are those which have a melting point below 1000° C. (such compounds are known to those skilled in the art). The halides of the alkali metals lithium, sodium, and potassium, especially the fluorides and chlorides thereof, are particularly effective. Due to their lower melting point, the chlorides of magnesium and calcium are preferred over the fluorides of magnesium and calcium.

A further class of mineralizing agents comprises ammonium salts of carbonic acid or a mono or dicarboxylic acid with 1 to 4 C atoms; preferred are ammonium carbonate, ammonium bicarbonate, ammonium acetate, and ammonium oxalate.

Without being bound by theory, it is assumed that the effect of the mineralizing agents is due both to the halide base and to the ammonium salts and is the result of different principles that have not heretofore been investigated. It appears possible that the ammonium salt—although decomposed or sublimated below the actual reaction temperature—brings about the first nitration. In the case of the halide mineralizing agents it is possible that the formation of the perovskite structure is promoted by the liquid phase of the mineralizing agent.

The quantity of mineralizing agent to be employed lies within a broad range, specifically between 0.1 and 10 parts by weight per part by weight of the mixture of the Ta and Ln compounds; the preferred quantity lies in the range between 0.5 and 3, particularly between 1 and 3 parts by weight per part by weight of the mixture of the Ta and Ln compounds.

The powdery mixture that is being annealed is intensively mixed and homogenized before the actual annealing process; particularly good homogenization is provided by treating the powder mixture in a high-intensity mill, particularly a ball mill. Such mixing devices are well known in the art. As an alternative, the mineralizing agent(s) may be added to the mixture of Ta and Ln compounds in the form of an aqueous solution or suspension.

The actual annealing process is performed in a furnace in the presence of a reducing atmosphere containing ammonia. In addition to ammonia, the furnace atmosphere may contain nitrogen and, if necessary, hydrogen. As a rule the atmosphere basically consists of 10 to 100 parts by volume of ammonia and 0 to 90 parts by volume of nitrogen; preferred is an atmosphere that consists predominantly of ammonia. The reducing atmosphere for nitration that is fed to the furnace should be as free of water as possible. In order to permit at least partial recycling of the furnace atmosphere (e.g., an atmosphere consisting primarily of ammonia), it is expedient to conduct it to a drier and then to perform recycling.

The annealing process is run until a phase-pure oxonitride of the formula $LnTaON_2$ is formed out of the raw materials. The annealing period is about 10 to 30 hours. The annealing temperature is sufficiently high to product annealing and in general lies below that of the already known process, i.e., below 1000° C. Usually the annealing temperature lies between 750° and 950° C., particularly between 850° and 950° C. Given an annealing temperature between 850° and 950° C. and a furnace atmosphere consisting primarily of ammonia, the annealing period is about 10 to 30 hours for the Ta and Ln compounds in the form of an oxide or of a preliminary oxide product.

Due to decomposition or sublimation, the mineralizing agents are partially removed from the annealing mixture during the annealing process itself. If desirable or necessary, the annealing process may be followed by wet treatment for removing mineralizing agent components. The secondary treatment may be combined with a conventional milling process, for example, in a ball mill. Aqueous solutions, whose preferred pH value ranges from neutral to acid, may be used in the wet treatment. Separation of suspended solids from gases can be conveniently carried out using water in conventional equipment such as is described in "Unit Operations" by George G. Brown, published by John Wiley & Sons, Inc., New York, 1950, pages 119–120, relied on and incorporated by reference.

With the present invention's use of the adjuvant referred to as a mineralizing agent—adjuvants which promote the reaction of solids are sometimes described in the specialist literature as mineralizing agents, sometimes as fluxes—it is surprisingly possible to obtain oxonitrides of greater brightness.

Based on the enhanced brightness (as measured by DIN (German Industrial Standard) 5033, Part 3) of the oxonitrides produced by the process according to the present invention, these products open up a new area of application, namely their use as coloring pigments. In the past, both their brownish color, which was less than attractive, and their insufficient brightness worked against the use as pigments of the general type of oxonitrides produced according to the already known process. With the process according to the present invention it surprisingly became possible to remedy this deficiency, so that temperature-stable pigments whose color ranges from yellow-orange to reddish brown are now available—ones which do not contain metals that are questionable from the toxicological standpoint. The oxonitrides according to the present invention may be employed as pigments specifically for plastics, lacquers, printing color, and inks. The high thermal stability of the oxonitrides permits the plastics to be dyed while in the mass, with subsequent extrusion at temperatures from 200° to 300° C. Baking varnishes can also be successfully dyed with the pigments due to the latter's thermal stability. Many suitable thermoplastic and thermosetting synthetic resins can be colored or dyed in this way.

In addition to the unexpected advantage of providing phase-pure oxonitrides of enhanced brightness which are well-suited as pigments, the process according to the present invention provides other advantages: surprisingly, it was possible to considerably reduce the reaction period as compared to the already known process. Whereas the already known process calls for an annealing temperature of about 1000° C. and also a very high flow speed for the nitration gas (ammonia) over the powder mixture, the process according to the present invention permits a reduction in the annealing temperature and in the flow speed of the nitration gas. Reduction in flow rate of ⅔ for example can be achieved. The process according to the present invention thus combines different process-technical advantages which are significant in transferring the process from the laboratory scale to the industrial scale.

The following examples and comparative examples demonstrate the superiority of the process according to the present invention and of the resulting products. Further examples deal with the use of the oxonitrides produced according to the present invention in dyeing a plastic.

Measuring parameters for the absorption spectra of FIGS. 1 to 3:

| | |
|---|---|
| apparatus: | Cary 2400 UV-VIS spectrophotometer Varian Co., Darmstadt |
| measuring range: | 400 to 780 nm |
| base lines: | corrected measurements |
| weighed portion: | 60 mg sample on 4.5 g $BaSO_4$ |
| ordinate: | absorption |
| abscissa: | wavelength in nm |
| scanning rate: | 1 nm sec$^{-1}$ |
| measuring interval: | 0.5 nm |

Comparative Example 1

Tantalum (V) oxide ($Ta_2O_5$) and lanthanum oxide ($La_2O_3$) in a molar ratio of 1 to 1 are mixed and homogenized by milling in a ball mill for 30 minutes. 2 g of the mixture is annealed in a corundum vessel at 950° C. for 48 hours in an externally heated reaction tube under a current of ammonia (15 l/h), resulting in the conversion to $LaTaON_2$. The "$LaTaON_2$ (VB1)" curve in FIG. 1 shows the absorption spectrum.

Comparative Example 2

In the same manner as in comparative example 1, an equimolar powder mixture of $Ta_2O_5$ and praseodymium oxide ($Pr_2O_3$) is mixed, homogenized, and annealed in a $NH_3$ current for 48 hours at 950° C. The absorption spectrum of the resulting $PrTaON_2$ is shown by the "$PrTaON_2$ (VB 2)" curve of FIG. 2.

EXAMPLE 1

An equimolar powder mixture of $Ta_2O_5$ and $La_2O_3$ is combined with three times the quantity by weight of a NaCl/KCl mineralizer mixture (weight ratio 44/56) and the total mixture is homogenized by milling for 30 minutes in a ball mill. The homogenized mixture (2 g per corundum vessel) is annealed in the furnace apparatus described in comparative example 1:

| | |
|---|---|
| temperature: | 900° C. |
| duration: | 24 h |
| $NH_3$: | 10 l/h |

The absorption spectrum of the resulting oxonitride $LaTaON_2$, which is red-shifted and brighter in color than the product of comparative example 1, is shown by the "$LaTaON_2$ (B 1)" curve in FIG. 1.

EXAMPLE 2

Example 1 of the invention was repeated with the single difference that $Pr_2O_3$ was used instead of $La_2O_3$. The absorption spectrum of the $PrTaON_2$, which is red-shifted and brighter in color than the product of comparative example 2, is shown by the "$PrTaON_2$ (B 2)" curve in FIG. 2.

EXAMPLE 3

Example 1 of the invention was repeated with the single difference that gadolinium oxide ($Gd_2O_3$) was used instead of $La_2O_3$. The absorption spectrum of the resulting brighter orange-colored $GdTaON_2$ is shown in FIG. 3.

EXAMPLE 4

The oxonitrides $LaTaON_2$, $PrTaON_2$, $GdTaON_2$ of examples 1 to 3 were incorporated in PVC plastisol, in both full tone and in a bleach mixture, and were tested for color. For the full tone, 1 g of the given oxonitride and 3 g plastisol were mixed and dispersed in a color rub-out apparatus. For the bleach mixture, 0.1 g of the oxonitride and 1 g $TiO_2$ were blended and then mixed with PVC plastisol and homogenized.

Smears with a thickness of 0.5 mm were made from the paste in a slide and were thickened by heating to 140° C. for 10 minutes. The color values L*, a*, and b* were measured with a spectrophotometer in a CIE lab system (DIN 5033, Part 3). The results are shown in the following table:

|    | $LaTaON_2$ |                  | $PrTaON_2$ |                  | $GdTaON_2$ |
|    | full tone | bleach mixture | full tone | bleach mixture | full tone |
|----|-----------|----------------|-----------|----------------|-----------|
| L* | 25.04     | 55.12          | 23.09     | 50.98          | 45.96     |
| a* | 23.35     | 10.84          | 22.39     | 11.99          | 20.70     |
| b* | 15.07     | 11.58          | 13.22     | 9.36           | 29.59     |

Further variations and modifications of the foregoing will be apparent to those skilled in the art and such variations and modifications are attended to be encompassed by the claims that are appended hereto.

German Priority Application P 43 17 421.3, filed on May 26, 1993, is relied on and incorporated by reference.

What is claimed:

1. A process for producing an oxonitride with a perovskite structure of the formula $LnTaON_2$, where Ln represents a rare-earth element, wherein said oxonitride displays enhanced brightness, said process comprising mixing
    (a) a tantalum (V) compound selected from the group consisting of Ta (V) oxides, Ta(V) oxide hydrates, Ta(V) oxonitrides, and mixtures thereof,
    (b) a rare-earth metal compound selected from the group consisting of oxides, oxide hydrates, hydroxides, carbonates, nitrates, carboxylates of a $C_1$ to $C_4$ mono- or dicarboxylic acid, and mixtures thereof, and
    (c) at least one mineralizing agent selected from the group consisting of alkali metal or alkaline earth halides, $Na_3AlF_6$, $Na_2SiF_6$, $AlF_3$, ammonia salts of carbonic acid, a mono- or dicarboxylic acid with 1 to 4 C atoms, and mixtures thereof, in a quantity of 0.1 to 10 parts by weight per parts by weight of said Ta and Ln compounds, to form a reaction mixture, heating said reaction mixture to annealing temperatures in a reducing atmosphere to form an annealed reaction mixture, and optionally removing said mineralizing agent(s) from said annealed reaction mixture.

2. The process according to claim 1, wherein said mineralizing agent is present in an amount of 0.5 to 3 parts by weight per parts by weight of said Ta and Ln compounds.

3. The process according to claim 2, wherein said mineralizing agent is present in an amount of 1 to 3 parts by weight per parts by weight of said Ta and Ln compounds.

4. The process according to claim 1, wherein said alkali metal or alkaline earth halide has a melting point below 1000° C.

5. The process according to claim 1, wherein said alkali metal or alkaline earth halide is a halide of Li, Na, or K.

6. The process according to claim 5, wherein said halide is a fluoride or a chloride.

7. The process according to claim 1, wherein said alkali metal or alkaline earth halide is a chloride of Mg or Ca.

8. The process according to claim 1, wherein said alkali or earth alkali halide is a fluoride of Mg or Ca.

9. The process according to claim 1, wherein said mineralizing agent is selected from the group consisting of ammonium carbonate, ammonium bicarbonate, ammonium acetate, and ammonium oxalate.

10. The process according to claim 1, wherein said atmosphere comprises ammonia and nitrogen and optionally hydrogen.

11. The process according to claim 1, wherein said atmosphere comprises 10-100 parts by volume ammonia and 0-90 parts by volume nitrogen.

12. The process according to claim 1, wherein the annealing temperature of said process is less than 1000° C.

13. The process according to claim 12, wherein said annealing temperature is 750°-950° C.

14. The process according to claim 13, wherein said annealing temperature is 850°-950° C.

15. The process according to claim 14, wherein said annealing occurs for about 10-30 hours.

16. The process according to claim 1, wherein said Ta(V) compound and said rare earth metal compound are present in an atomic ratio of about 1:1.

17. The process according to claim 1, wherein said Ta(V) compound is $Ta_2O_5$, $Ta_2O_5$.aq, or TaON.

18. The process according to claim 17, wherein said $Ta_2O_5$.aq contains hydration water in a quantity of 14 to 17% by weight relative to said $Ta_2O_5$.aq.

19. The process according to claim 1, wherein said rare earth metal compound is an oxide, oxide hydrate, or hydroxide of a rare-earth element with an atomic number of 39, 57 to 60, or 62 to 71.

20. The process according to claim 19, wherein said atomic number is 57 to 60 or 62 to 64.

21. The process according to claim 19, wherein said rare-earth element is lanthanum, praseodymium, or gadolinium.

22. The process according to claim 1, wherein said oxonitride is $LaTaON_2$, $PrTaON_2$, or $GdTaON_2$.

23. The process according to claim 1, wherein said reducing atmosphere comprises ammonia.

24. The process according to claim 23, wherein said reducing atmosphere is free of water.

25. The process according to claim 1, wherein said reaction mixture is intensively mixed and homogenized before annealing.

26. The process according to claim 1, further comprising wet grinding in a mill.

* * * * *